(12) United States Patent
Mogoreanu et al.

(10) Patent No.: US 11,886,161 B2
(45) Date of Patent: Jan. 30, 2024

(54) CONFIGURING AND BUILDING AN AUTOMATION SYSTEM TO PERFORM RULE-BASED TRANSFORMATIONS ON COMPLEX TECHNICAL SYSTEMS

(71) Applicants: Serghei Mogoreanu, Munich (DE); Nataliia Rümmele, Munich (DE); Swathi Shyam Sunder, Munich (DE)

(72) Inventors: Serghei Mogoreanu, Munich (DE); Nataliia Rümmele, Munich (DE); Swathi Shyam Sunder, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 651 days.

(21) Appl. No.: 16/887,678

(22) Filed: May 29, 2020

(65) Prior Publication Data
US 2020/0387132 A1 Dec. 10, 2020

(30) Foreign Application Priority Data
Jun. 6, 2019 (EP) .................................... 19178776

(51) Int. Cl.
*G06F 16/90* (2019.01)
*G05B 19/401* (2006.01)
(Continued)

(52) U.S. Cl.
CPC ....... *G05B 19/401* (2013.01); *G06F 16/9024* (2019.01); *G06N 5/02* (2013.01);
(Continued)

(58) Field of Classification Search
USPC ........................................................ 707/756
See application file for complete search history.

(56) References Cited

U.S. PATENT DOCUMENTS

| 7,941,438 | B2 * | 5/2011 | Molina-Moreno | G06F 8/35 717/109 |
| 8,046,737 | B2 * | 10/2011 | Wittenberg | G06F 9/451 717/109 |

(Continued)

FOREIGN PATENT DOCUMENTS

WO WO2013097892 A1 7/2013

OTHER PUBLICATIONS

Anicic, Darko, et al. "A rule-based language for complex event processing and reasoning." International Conference on Web Reasoning and Rule Systems. Springer, Berlin, Heidelberg, 2010. pp. 42-57. (Year: 2010).*

(Continued)

*Primary Examiner* — Hanh B Thai
(74) *Attorney, Agent, or Firm* — Lempia Summerfield Katz LLC (57) ABSTRACT

System and methods for configuring a technical system based on generated rules and building the technical system. The technical system and the generated rules are given in graph representations including the following steps: defining rules by a user and representing the rules in a graphical interface, converting the rules from the graphical interface into a programming language and/or a natural language, validating the rules for the technical system, checking the compatibility of the rules, serializing the rules for storage in a file system or a database, using the serialized rules to configure the technical system, and building the configured technical system.

20 Claims, 7 Drawing Sheets

(51) Int. Cl.
*G06N 5/02* (2023.01)
*G06F 16/901* (2019.01)
*G06F 40/55* (2020.01)
*G06N 5/025* (2023.01)
*G06F 16/242* (2019.01)

(52) U.S. Cl.
CPC .............. *G05B 2219/31368* (2013.01); *G05B 2219/40346* (2013.01); *G06F 16/243* (2019.01); *G06F 40/55* (2020.01); *G06N 5/025* (2013.01)

(56) References Cited

U.S. PATENT DOCUMENTS

| | | | | |
|---|---|---|---|---|
| 8,132,148 | B2* | 3/2012 | Williams | G06F 9/451 717/110 |
| 8,260,441 | B2* | 9/2012 | Scheega | G05B 13/027 706/20 |
| 8,275,793 | B2* | 9/2012 | Ahmad | G06F 9/466 707/792 |
| 8,418,132 | B2* | 4/2013 | Williams | G06F 40/143 717/113 |
| 8,601,438 | B2* | 12/2013 | Vasista | G06F 40/151 717/136 |
| 9,864,586 | B2* | 1/2018 | Kaulgud | G06F 8/73 |
| 10,185,720 | B2* | 1/2019 | Grasselt | G06F 16/288 |
| 11,049,049 | B2* | 6/2021 | Junker | G06N 5/02 |
| 2006/0265689 | A1* | 11/2006 | Kuznetsov | G06F 9/546 717/117 |
| 2008/0256014 | A1* | 10/2008 | Gould | G06N 5/04 706/47 |
| 2008/0294590 | A1* | 11/2008 | Gupta | G06N 5/02 706/59 |
| 2008/0306986 | A1* | 12/2008 | Doyle, Sr. | G06F 8/51 717/136 |
| 2009/0018866 | A1* | 1/2009 | Christen | G06Q 10/10 705/2 |
| 2010/0125828 | A1* | 5/2010 | Vasista | G06F 40/151 717/109 |
| 2012/0059784 | A1* | 3/2012 | Gould | G06F 8/10 706/47 |
| 2014/0280370 | A1* | 9/2014 | Oberle | G06F 16/289 707/803 |
| 2014/0358865 | A1* | 12/2014 | Brummel | G06F 16/245 707/769 |
| 2016/0300137 | A1* | 10/2016 | Abele | G05B 19/0428 |
| 2017/0293276 | A1* | 10/2017 | Hubauer | G06F 16/24522 |
| 2020/0134474 | A1* | 4/2020 | Marcé | G06N 7/08 |
| 2021/0232591 | A1* | 7/2021 | Portisch | G06F 16/24564 |

OTHER PUBLICATIONS

Cordeiro, Renato. "What is the difference between a high-level language and a query language?" Published in 2018 by Quora.com. Accessed Aug. 30, 2022 from https://www.quora.com/What-is-the-difference-between-a-high-level-language-and-a-query-language (Year: 2018).*

Hart, Casey. "What is an ontology?" Published on Dec. 10, 2021. Accessed Aug. 29, 2022 from https://oliveai.com/resources/blog/what-is-an-ontology (Year: 2021).*

Nassar, Nefretiti, and Mark Austin. "Model-based systems engineering design and trade-off analysis with RDF graphs." Procedia Computer Science 16 (2013): 216-225.

Anonymous: "Framework—Indigo—A Solution for Integrating Machinery and It Systems and Enabling Control by Means of Graphical Process Modelling Using the Business Process Model and Notation", Stabilis Powerd by Indigo, XP055631919, pp. 1-15; 2019.

European Search Report for European Application No. 19178776. 1-1217 dated Oct. 22, 2019.

Fishkin Alexey: "Industrial Knowledge Graph at Siemens", Powered by metaphactory and Amazon Neptune, CERN Openlab Technical Workshop, Geneva, XP055631924, Retrieved from the Internet: URL:https://indico.cern.ch/event/669648/contributions/2838194/attachments/1581790/2499984/CERN Open Lab Technical Workshop—Siemens AG. pp. 7-13; 2017.

* cited by examiner

CONFIGURING AND BUILDING AN AUTOMATION SYSTEM TO PERFORM RULE-BASED TRANSFORMATIONS ON COMPLEX TECHNICAL SYSTEMS

CROSS REFERENCE TO RELATED APPLICATIONS

This application claims the benefit of EP 19178776.1.8 filed on Jun. 6, 2019, which is hereby incorporated by reference in its entirety.

FIELD

Embodiments relate to computerized method for configuring a technical system.

BACKGROUND

Complex technical systems include of many diverse interconnected components. Examples for such complex technical systems are industrial systems, engineering systems, automatization systems, and technical projects on the industrial system. Representing such systems as graphs is the most natural way since the components are inter-connected. In addition, this form of representation allows for incorporating present hierarchies of system components as well as configuration parameters.

To configure and maintain such systems, engineers often have a set of rules either explicitly or implicitly present. The rules may cover different aspects of the complex system, e.g. the rules might indicate what configuration parameters should be used for combinations of components, what additional components may be added given the current state of the system, or how present components may be connected. However, there is no standard approach how an engineer may specify such rules and evaluate them against the given system.

Since the complex technical system may be represented as a graph, it is natural to assume that rules for system maintenance and development may be expressed using graph representation.

So far, there is no standard to specify rules for engineering tasks/representing technical systems as graphs. Often such rules are not even written down explicitly in a machine-readable format and exist implicitly in the minds of experts. This not only slows down the process of evaluating rules, but also complicates knowledge sharing in the domain. Another potential risk is inconsistence among rules.

The process to identify which graph transformations need to be triggered based on the given collection of rules is mainly performed via manual inspection of the technical project. Such approach requires considerable time and effort from engineers and may be highly error prone.

BRIEF SUMMARY AND DESCRIPTION

The scope of the present disclosure is defined solely by the appended claims and is not affected to any degree by the statements within this summary. The present embodiments may obviate one or more of the drawbacks or limitations in the related art.

Embodiments improve the representation of technical systems and facilitate the construction, configuration, and maintenance of technical systems.

Embodiments provide a method to define and validate rules to be used to represent and construct a technical system.

The computerized method provides for the specification/generation of the rules for desired/required transformations of the given technical system and to automatically evaluate the specified rules on the given technical system.

Embodiments provide a computerized method for configuring a technical system based on generated rules and building/constructing the technical system. The technical system and the generated rules are given in graph representations, including the steps:

a. Defining (or specifying or initializing) rules by a user and representing the rules in a graphical interface,
b. converting the rules from the graphical interface into a programming language and/or a natural language,
c. validating the rules for the technical system,
d. checking the compatibility/consistency of the rules,
e. serializing the rules for storage in a file system or a database,
f. using the serialized rules to configure the technical system, and
g. building/constructing the configured technical system by a construction system.

Validating the rules for the technical system included a validation if the rule may be applied to the technical system. This process also includes presenting effects of the rules on the technical system, that are referred to as "rule-based" transformations.

Checking the compatibility/consistency of the rules includes checking if there are e.g. some rules that include the same condition but conflicting consequences.

Embodiments simplifies the process of constructing rules for configuring/configuring technical projects/systems, but also ensures quality (by providing a way to validate the constructed rule, as well as compare it to the existing ones), thus promoting efficient knowledge transfer between users.

According to an embodiment the rules are specified as a tuple with a technical condition (in form of a graph) and a corresponding technical consequence (in form of another graph). If the technical condition is satisfied, the corresponding technical consequence takes effect.

An example for a technical condition is e.g. a measured air pressure above a certain value, with the corresponding technical consequence is e.g. to reduce the air pressure by a specific amount or based on a certain threshold.

A further example is the presence of pressure relief valve component within a system (condition), that requires the engineer to add a programming block responsible for checking the air pressure (condition). In this example the condition and the consequence refer to things of different nature within the system.

To provide defining/specifying/initializing such (condition, consequence) rules, the following different possibilities are proposed: Elements of the technical system are represented by nodes and connections between the elements are represented by links between the nodes. The nodes and links may be modified by specifying type and other data properties. Guidance is provided to the user by validation of input against the domain ontology. Depending on the nature of the ontology, the user might expect, for example, a warning when specifying a link (relation) between elements, for which such a link (relation) is not applicable. Initialization of rules from the graph representation of the technical system. Initialization of rules from the graph representation of the technical system either by clicking single nodes or selecting areas of the graph. Initialization of rules from existing collection of rules.

According to an embodiment the programming language is a graph query in SPARQL, GDL, Cypher, Gremlin, or another language, based on the corresponding selected data model.

The natural language into which the rules are converted from the graphical interface may use sentences in form of "If . . . , then . . . " constructions to describe the technical condition-consequence-tuples.

According to an embodiment, the results of the validation are shown in the graphical interface. This has the advantage that it is visually illustrated which and how parts of the technical system/technical project are affected by the defined rules.

According to an embodiment, semi-automatically and/or automatically generated descriptions and/or annotations are added to the rules. This has the advantage that explanations for the rules are given, that may help a user.

According to a further embodiment, a user of the technical system is notified if the compatibility check detects compatibility conflicts. This has the advantage that the user may changes rules if conflicts are found.

According to a further embodiment the serialized rules are persisted to a file system and/or stored within a database. For example, if Resource Description Framework (RDF) is used for the graph representation, rules may be serialized using RDF syntax and persisted within the graph database (in case of RDF graph such a database will most likely be a triple store) in a dedicated named graph.

According to a further embodiment, the graph representation of the rules and of the technical system is expressed in a domain ontology. For example, rules operate with vocabulary outlined in the ontology.

According to a further embodiment, the domain ontology may be provided using, for example, the Resource Description Framework (RDF), the Labelled Property Graph Model (Labelled PGM) or the Extended Property Graph Model (Extended PGM).

There are two possibilities to model the technical system as a graph, RDF and PGM (Property Graph Model, including all available variations, such as Labelled-property graph or Extended Property Graph Model). The choice of the model may be based on the specific requirements, such as efficiency, data complexity, and sharing of data.

While it is not necessary for the ontology to adhere to the RDF (Resource Description Framework) specification, doing so may lead to various benefits because of the availability of tools based on RDF and the associated capabilities.

Further, the selection of the graph data model drives the choice of language used to query the graph. For example, while SPARQL is part of the RDF stack, Cypher and GDL are used with property graphs. There is also Gremlin. Embodiments may use either representation model (RDF or PGM) and correspondingly use either choice of a graph query language as well as a graph database management system (e.g., BlazeGraph, Neo4j, Amazon Neptune etc.).

According to a further embodiment, the technical system is an engineering system, an automatization system, a production system, and/or an industrial system and/or includes a technical project on the technical system.

Embodiments provide a computational device configured to carry out the steps of the method.

Embodiments provide a computer program product including instructions that, when the program is executed by the computational device, cause the computational device to carry out the steps of the method.

Embodiments provide a computer-readable storage medium including instructions that, when executed by the computational device, cause the computational device to carry out the steps of the method.

Embodiments provide reduced time and effort owing to the automated evaluation of rules, possibility for reusing the rules among engineers, and a consistent way of representing rules, which improves knowledge transfer among engineers. So far, there is no standard approach how an engineer may specify such rules and evaluate them against a technical project. Embodiments further provide improved quality of rules resulting from the automated evaluation and consistency checks on rule collections.

DETAILED DESCRIPTION

Figure 1:
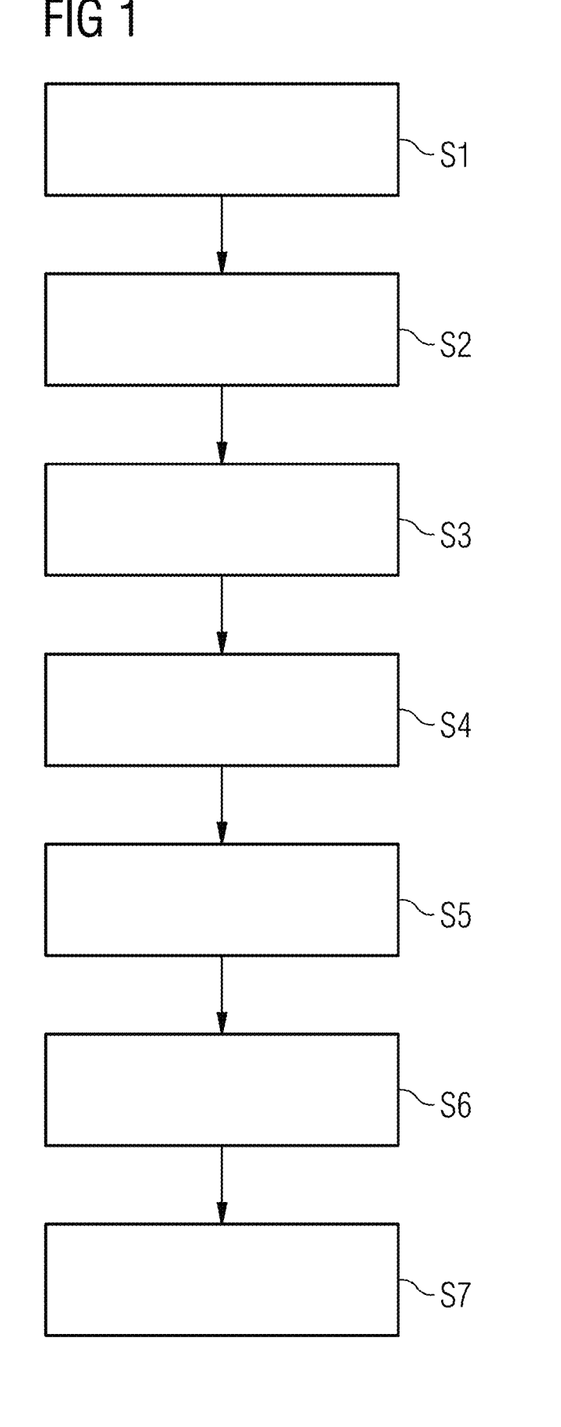
FIG. 1 depicts a flow diagram according to an embodiment.

FIG. 1 depicts a flow diagram of the computerized method for configuring a technical system based on generated rules and building the technical system. The technical system and the generated rules are given in graph representations.

The method includes the following steps:
a. in step S1 rules are defined by a user in the graphical interface,
b. in step S2 the rules are converted from the graphical interface into a programming language and/or a natural language,
c. in step S3 the rules are validated for the technical system,
d. in step S4 the compatibility of the rules is checked,
e. in step S5 the rules are serialized for storage in a file system or a database,
f. in step S6 the serialized rules are used to configure the technical system, and
g. in step S7 the configured technical system is configured by a construction system.

Figure 2A:
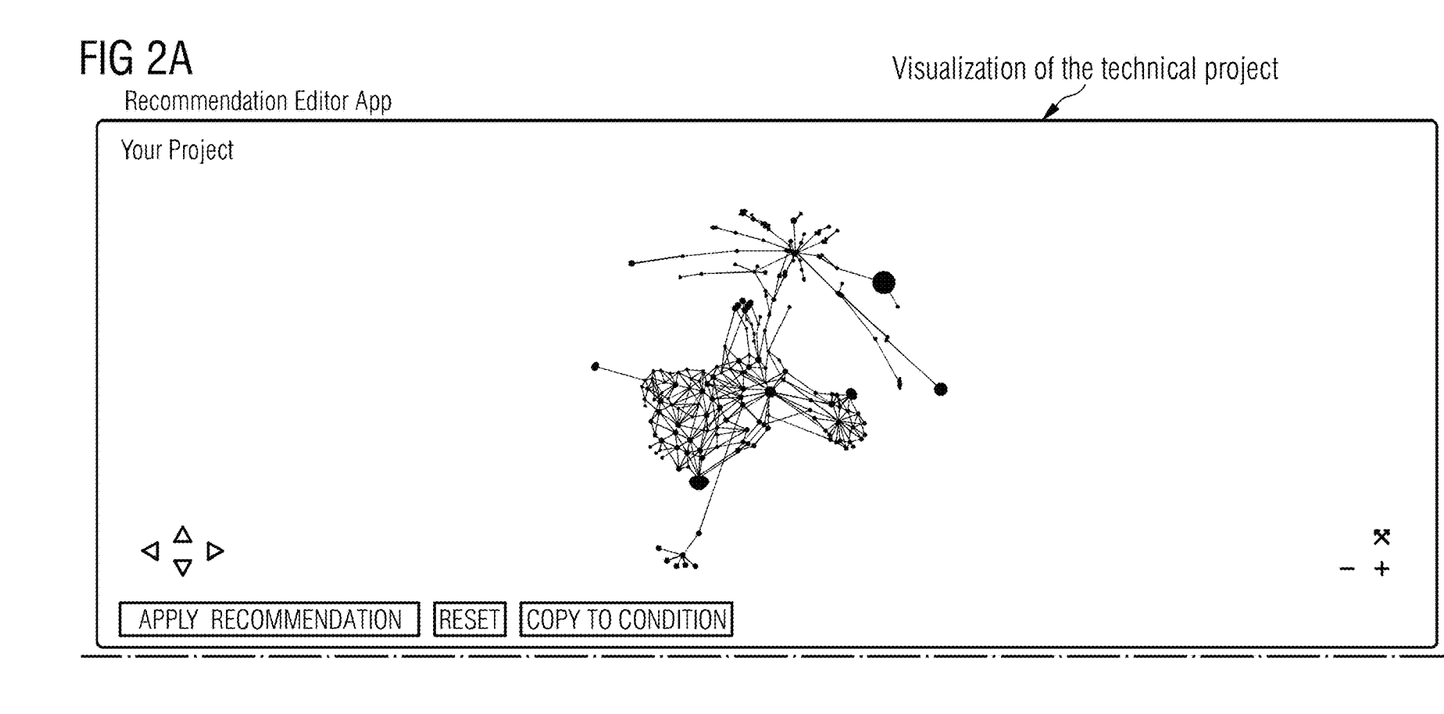
FIG. 2A depicts a user interface for defining, configuring, visualizing, and evaluating rules in the form of a tuple of graph patterns according to an embodiment.
Figure 2B:
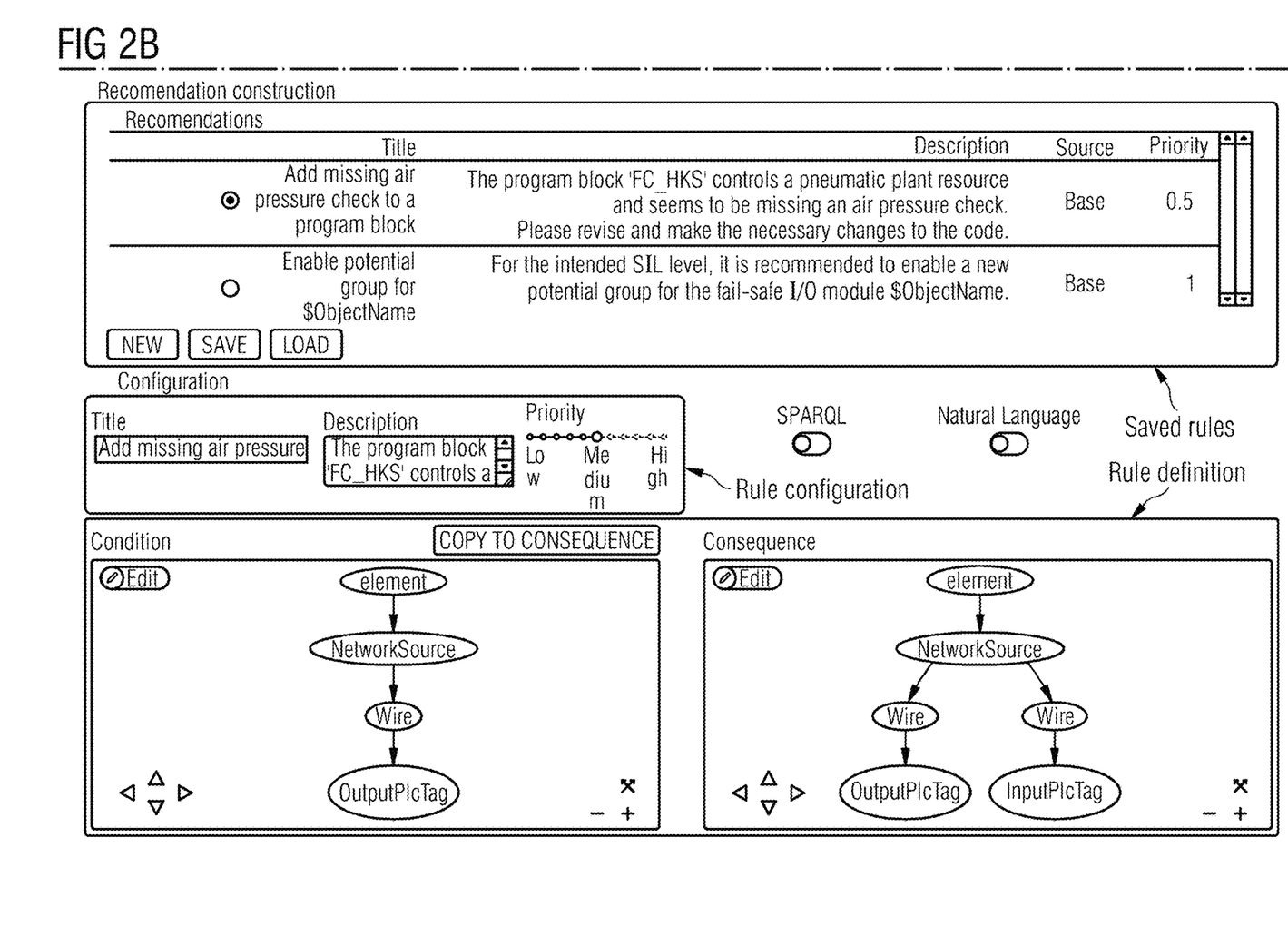
FIG. 2B depicts a user interface for defining, configuring, visualizing, and evaluating rules in the form of a tuple of graph patterns according to an embodiment.

FIG. 2 depicts the interface for the proposed method executed by a computer program product including instructions that, when the computer program product is executed by a computational device, cause the computational device to carry out the steps of the method.

The various components shown in FIG. 2 correspond to the features described by the method. The top box/first box depicts the "Visualization of the technical project" in form of a graph. The second box (saved rules) and the third box (rule configuration)/boxes in the middle help the user with the definition of the rules. The bottom box/fourth box depicts the "rule definition" with a technical condition and its technical consequence.

Figure 3:
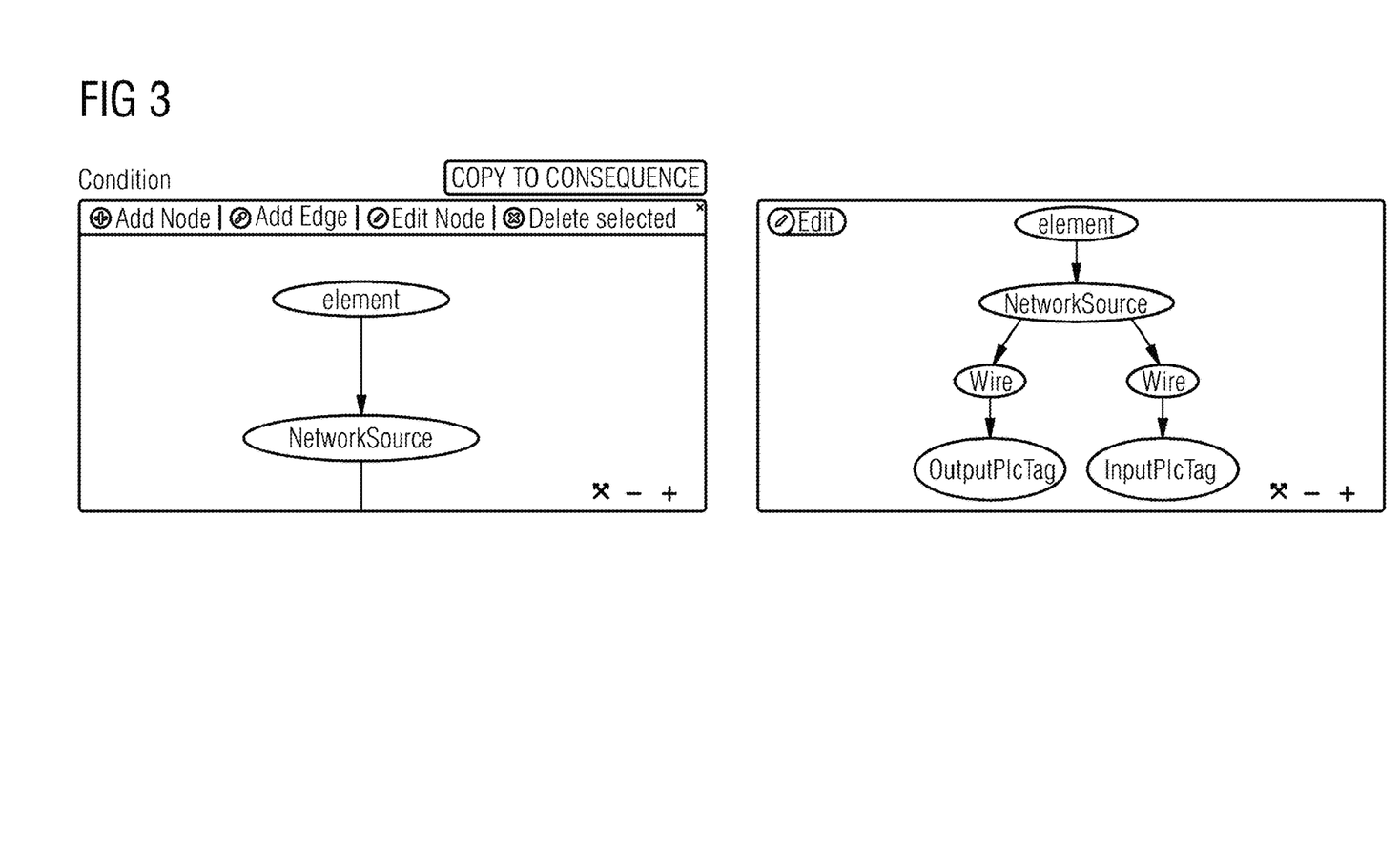
FIG. 3 depicts how to modify defined rules according to an embodiment.

FIG. 3 depicts how to modify defined rules. By clicking on the edges (arrows) or nodes (bubbles) the user may select them for modification or deletion. Selected edges or nodes have a different color. The user may also add new edges or nodes.

Figure 4:
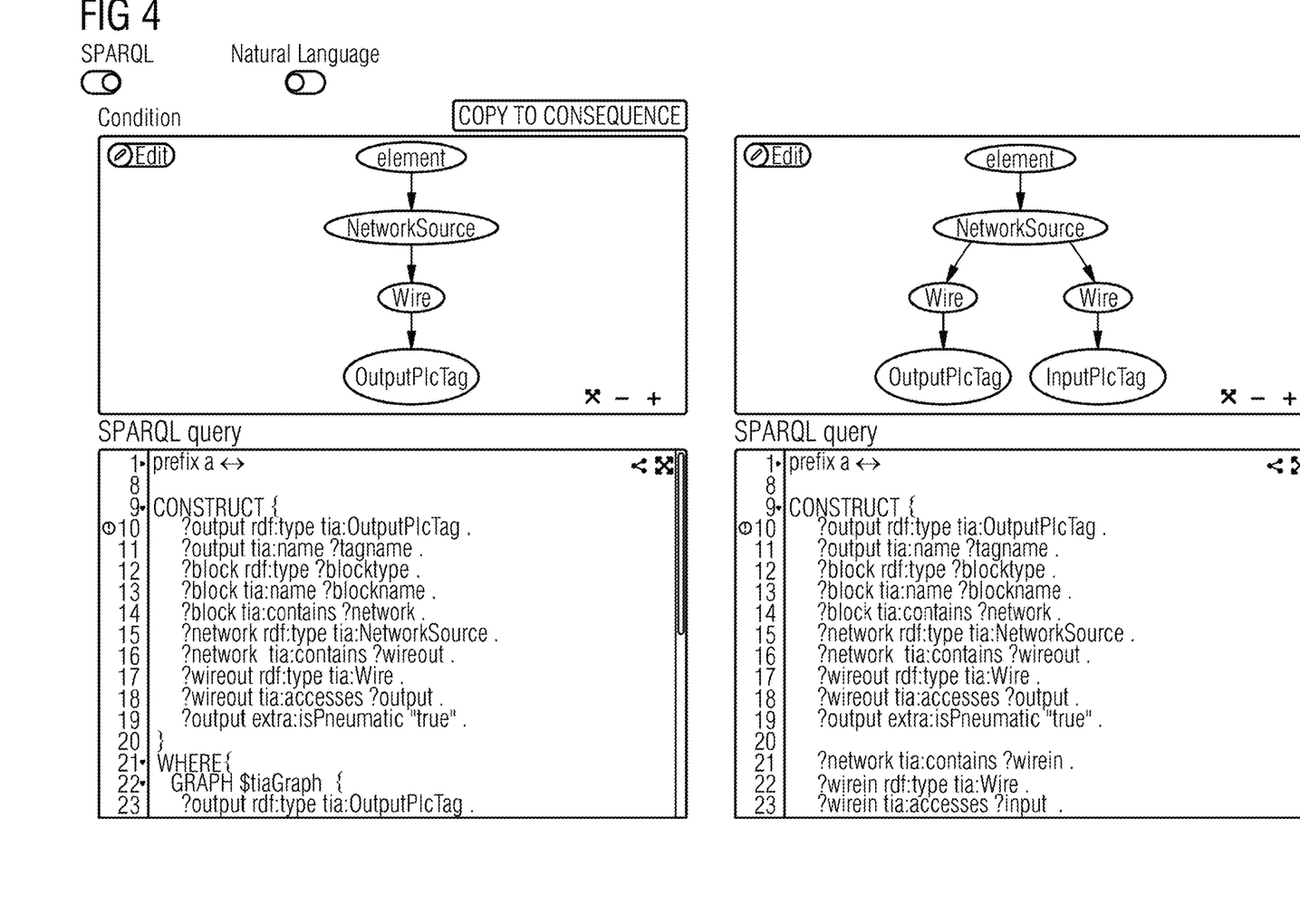
FIG. 4 depicts rules automatically converted into a programming language according to an embodiment.

FIG. 4 depicts rules automatically converted into a programming language. In the example SPARQL queries are auto-generated based on a defined/specified rule.

Figure 5:
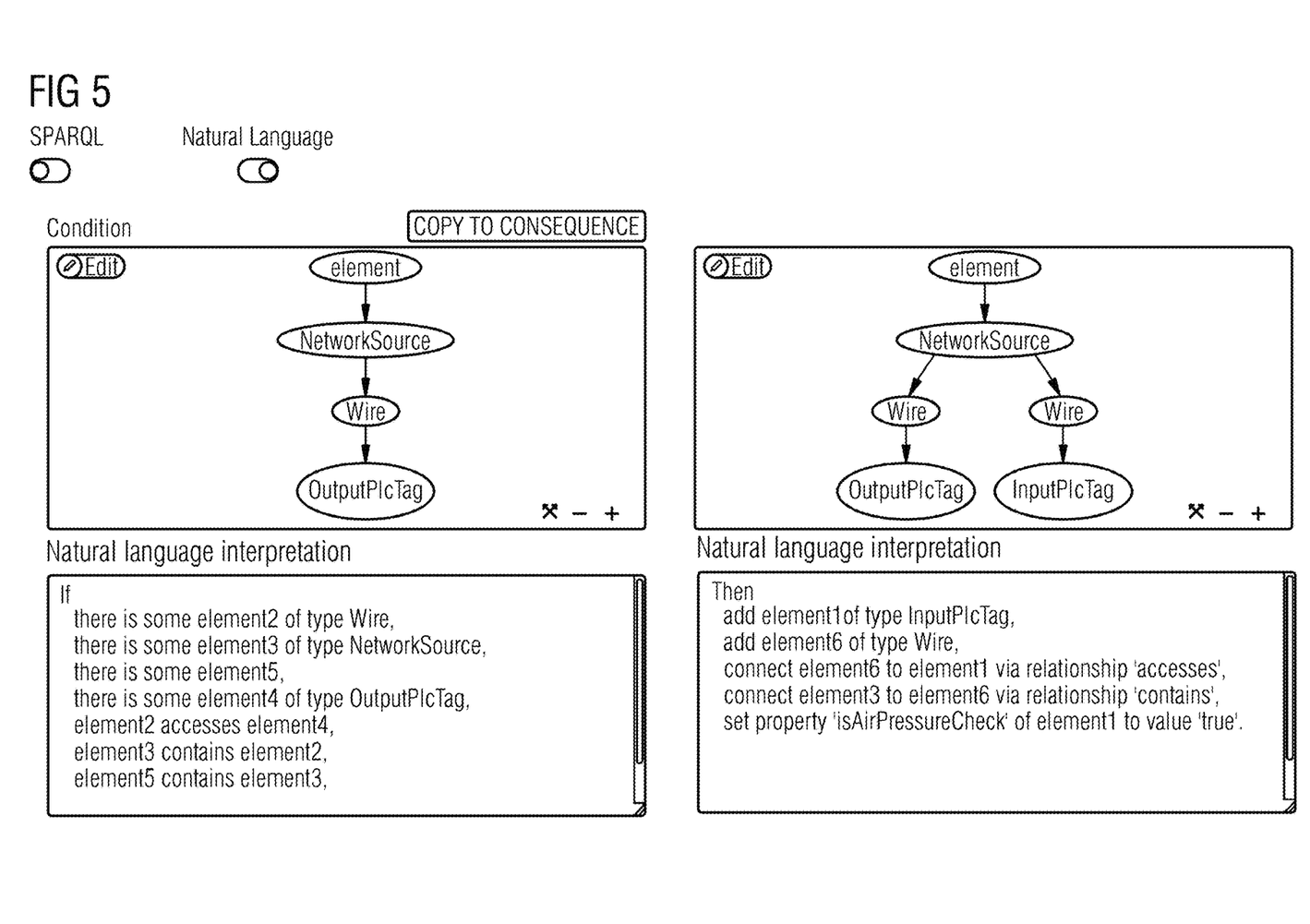
FIG. 5 depicts rules automatically converted into a natural language according to an embodiment.

FIG. 5 depicts rules automatically converted into a natural language based on a defined/specified rule.

Figure 6:
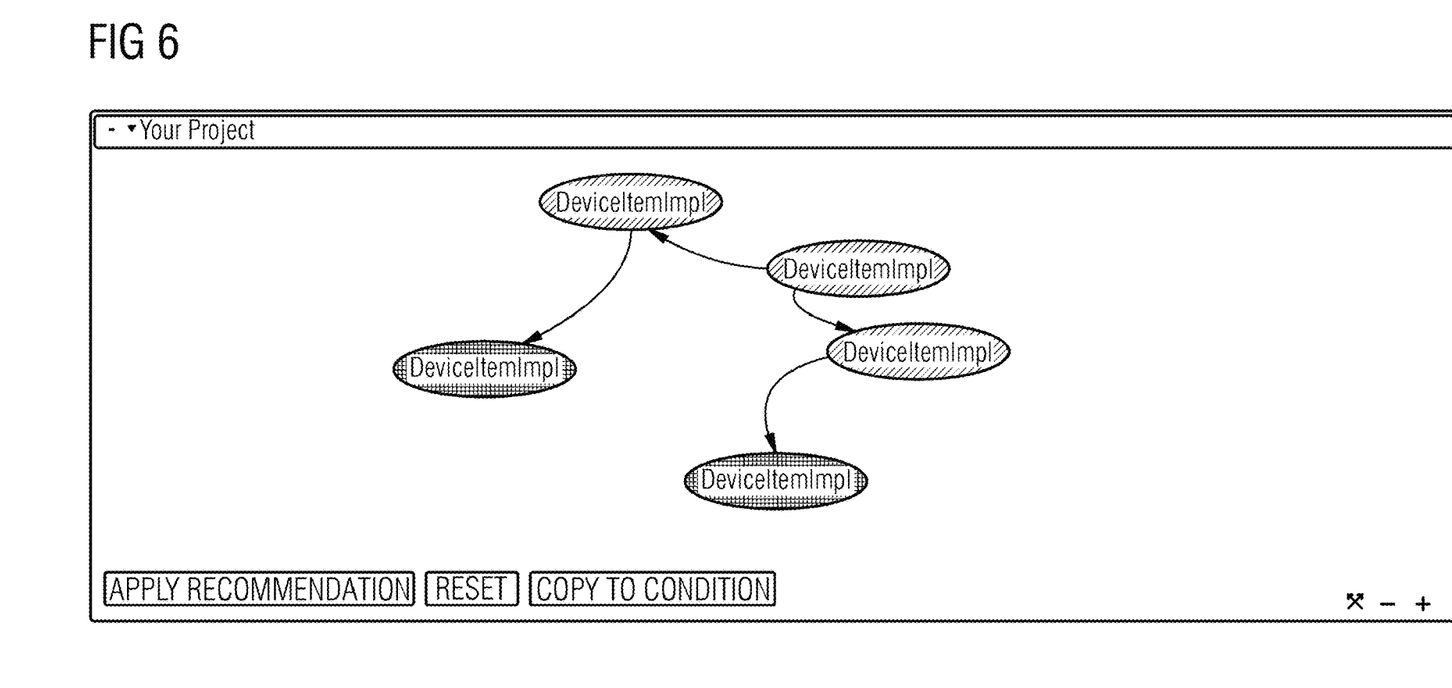
FIG. 6 depicts a validation of the rules for a technical system according to an embodiment.

FIG. 6 depicts a validation of the rules for a technical system. The example illustrates how a user may evaluate a defined rule against/for the technical project. First, the elements of the project that get matched according to the condition of the rule are colored in one color (here striped). Then, the modified elements are colored differently (here squared). Like this it is validated if the rule may be applied to the technical system.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that the dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computerized method for configuring a technical system based on generated rules and building the technical system, wherein the technical system and the generated rules are provided in graph representations, the method comprising:
defining rules by a user;
representing the rules in a graphical interface;
converting the rules from the graphical interface into a programming language, a natural language, or a programming language and a natural language;
validating the rules for the technical system;
checking a compatibility of the rules;
serializing the rules for storage in a file system or a database;
using the serialized rules to configure the technical system; and
building the configured technical system.

2. The method of claim 1, wherein the rules are specified as a tuple with a technical condition and a corresponding technical consequence.

3. The method of claim 1, wherein the programming language is a graph query comprising one of Simple Protocol and Resource Description Framework Query Language (SPARQL), graph definition language (GDL), Cypher, or Gremlin, and based on a corresponding selected data model.

4. The method of claim 1, wherein the results of the validation are shown in the graphical interface.

5. The method of claim 1, wherein semi-automatically or automatically generated descriptions, annotations, or descriptions and annotations are added to the rules.

6. The method of claim 1, wherein a user of the technical system is notified if the compatibility check detects one or more compatibility conflicts.

7. The method of claim 1, wherein the serialized rules are persisted to the file system, stored within the database, or persisted to the file system and stored within the database.

8. The method of claim 1, wherein the graph representation of the rules and of the technical system are expressible in a domain ontology.

9. The method of claim 8, wherein the domain ontology is provided using a Resource Description Framework (RDF), a Labelled Property Graph Model (Labelled PGM) or an Extended Property Graph Model (Extended PGM).

10. The method of claim 1, wherein the technical system comprising at least one of an engineering system, an automatization system, a production system, an industrial system.

11. The method of claim 10, wherein the technical system includes a technical project.

12. A non-transitory computer implemented storage medium that stores machine-readable instructions executable by at least one processor for configuring a technical system based on generated rules, the machine-readable instructions comprising defining rules by a user;
representing the rules in a graphical interface;
converting the rules from the graphical interface into a programming language, a natural language, or a programming language and a natural language;
validating the rules for the technical system;
checking a compatibility of the rules;
serializing the rules for storage in a file system or a database; and
using the serialized rules to configure the technical system.

13. The non-transitory computer implemented storage medium of claim 12, wherein the machine-readable instructions further comprise:
building the configured technical system.

14. The non-transitory computer implemented storage medium of claim 12, wherein the rules are specified as a tuple with a technical condition and a corresponding technical consequence.

15. The non-transitory computer implemented storage medium of claim 12, wherein the programming language is a graph query comprising one of Simple Protocol and Resource Description Framework Query Language, graph definition language, Cypher, or Gremlin, and based on the corresponding selected data model.

16. The non-transitory computer implemented storage medium of claim 12, wherein the results of the validation are shown in the graphical interface.

17. The non-transitory computer implemented storage medium of claim 12, wherein semi-automatically or automatically generated descriptions, annotations, or descriptions and annotations are added to the rules.

18. The non-transitory computer implemented storage medium of claim 12, wherein a user of the technical system is notified if the compatibility check detects compatibility conflicts.

19. The non-transitory computer implemented storage medium of claim 12, wherein the serialized rules are persisted to the file system, stored within the database, or persisted to the file system and stored within the database.

20. The non-transitory computer implemented storage medium of claim 12, wherein the graph representation of the rules and of the technical system are expressible in a domain ontology.

* * * * *